Sept. 9, 1969  ICHIRO WADA  3,465,585
FLOW DETECTION SIGNAL GENERATOR FOR ELECTROMAGNETIC FLOWMETERS
Filed May 25, 1967  2 Sheets-Sheet 1

INVENTOR.
ICHIRO WADA
BY
[signature]
Atty

United States Patent Office 3,465,585
Patented Sept. 9, 1969

3,465,585
FLOW DETECTION SIGNAL GENERATOR FOR ELECTROMAGNETIC FLOWMETERS
Ichiro Wada, Yokohama-shi, Japan, assignor to Tokyo Shibaura Electro Co., Ltd., Kawasaki-shi, Japan, a corporation of Japan
Filed May 25, 1967, Ser. No. 641,349
Claims priority, application Japan, May 31, 1966, (Utility model) 41/50,492
Int. Cl. G01f 1/02
U.S. Cl. 73—194
7 Claims

ABSTRACT OF THE DISCLOSURE

A flow detection signal generator includes a non-magnetic metal duct having a plurality of symmetrically arranged cuts formed on its outer periphery to reduce eddy currents produced by a magnetic flux which diametrically penetrates the duct, while maintaining the mechanical strength of the duct at a predetermined value.

---

The present invention relates to a flow detection signal generator for electromagnetic flowmeters and more particularly to improvements in a flow detection signal generator whose duct serving as the flow path is made of an electroconducting material.

One common construction of a flow detection signal generator for electromagnetic flowmeters comprises an electroconducting duct through which the fluid passes and which is provided on its outer periphery with means for setting up a magnetic field transverse to the duct. On its inner wall surface the duct is provided with a pair of diametrically opposed insulated electrodes in such a manner that a line connecting both electrodes is perpendicular to the direction of the magnetic field within the duct. A voltage induced across the fluid flowing through the duct by the magnetic flux cut by the fluid is measured by the electromagnetic flowmeter connected across the electrodes to determine the flow rate of the fluid flowing through the duct from the relationship between the velocity of flow of the fluid and the voltage induced.

These ducts are generally made of a nonmagnetic nonmetallic material, such as paper impregnated with a synthetic resin to enhance the mechanical strength. Alternatively, they may also be made of a nonmagnetic metal. A duct made of a nonmagnetic metal has a great enough mechanical strength to withstand the fluid pressure. Thus, nonmagnetic metal ducts are usually used when handling a fluid under high pressures.

However, as is well known in the art, setting up of an alternating magnetic flux transverse to the duct results in the generation of eddy currents within the material of the duct. The eddy currents cause secondary magnetic fields which disturb the uniformity of the field and cause the instrument to give incorrect readings. The errors caused are particularly great if temperature variations in the fluid cause the eddy currents to vary in magnitude from place to place within the duct. As a result, a so-called zero level deviation (or variation) appears. That is, a varying output appears across the electrodes even when the rate of flow is zero.

Attempts have been made to reduce the eddy currents by reducing the wall thickness of the duct.

Reduction in the wall thickness, however, inevitably decreases the mechanical strength of the duct. A duct having extremely thin walls is likely to break if it is used for measurement involving fluids under high pressures because it cannot withstand mechanical distortions resulting from expansion or contraction of the duct material due to incidental changes in temperature of the fluid flowing therethrough. In practice, therefore, there is a certain compromise value of the wall thickness below which the wall thickness cannot be reduced. Consequently, complete elimination of zero-level deviation due to eddy currents and hence accurate measurement of flow rate has never been attained.

It is an object of this invention to provide an improved flow detection signal generator for electromagnetic flowmeters, which is simple in construction, and permits accurate measurement by virtue of the reduction of eddy current generation and whose duct has a high mechanical strength.

The invention provides a flow detection signal generator for electromagnetic flowmeters having a non-magnetic metal duct through which a conducting fluid, the rate of flow of which is to be measured, flows. The duct is provided with a diametrically opposed pair of insulated electrodes on its inner wall surface, and means to generate an alternating magnetic field substantially perpendicular to both the line connecting both of said electrodes and the direction of flow of the liquid. A voltage corresponding to the flow rate of the fluid through the duct is induced across the fluid by the cutting of the magnetic flux by the moving fluid, the voltage being supplied to the electromagnetic flowmeter. A plurality of cuttings are formed in the outer periphery of the duct so as to reduce eddy currents produced in said duct by said alternating magnetic flux such that the mechanical strength of the duct is maintained at a predetermined value.

The invention is now described in conjunction with preferred embodiments thereof with reference to the accompanying drawings in which.

Figure 1:
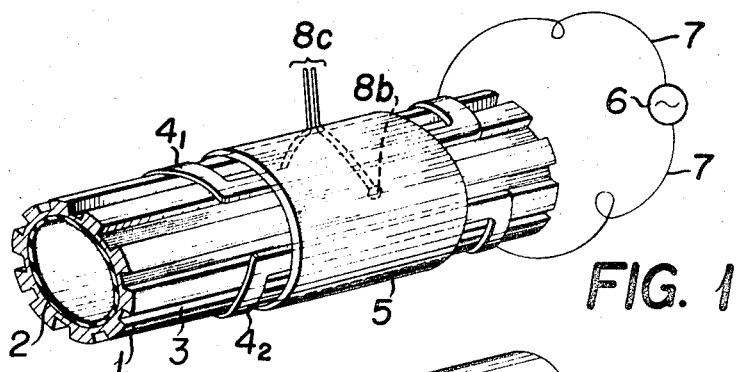
FIG. 1 is a perspective view illustrating one preferred embodiment according to the invention.
Figure 15:
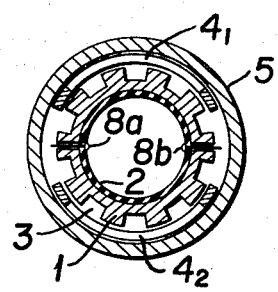
FIG. 15 is a cross-sectional view of the embodiment of FIG. 1 taken along a plane containing both electrodes.

Referring now to the drawings and particularly to FIGS. 1 and 15, there is shown perspective and sectional views, respectively, of a section of a cylindrical duct 1, which is made of a nonmagnetic metal such as copper. Other nonmagnetic materials may also be used for the duct 1. The duct 1 is lined along its length with a lining 2 which is formed of a mechanically and chemically stable insulating material such as polytetrachloroethylene. A plurality of axial parallel grooves 3 are formed on the outer surface of duct 1. Exciting windings $4_1$ and $4_2$ are disposed on diametrically opposed peripheral surfaces of the duct 1 such that when they are energized a magnetic flux is set up which diametrically penetrates the duct 1 which is normal to a first virtual plane containing a pair of electrodes (which are described below) and the axis of the duct 1. The duct 1 and exciting windings $4_1$ and $4_2$ are surrounded by a cylindrical core 5. A pair of electrodes 8a and 8b are attached to but insulated from diametrically opposed locations in the inner wall surface of the duct 1. The diametrical line connecting both electrodes 8a and 8b is perpendicular to the direction of the magnetic field to be set up and a portion of each of the electrodes 8a and 8b is in contact with the fluid flowing through the duct 1. The electrodes 8a and 8b are connected to input terminals of a fluid flowmeter by means of lead wires 8c. The exciting windings $4_1$ and $4_2$ are serially connected to an A-C source 6 through lead wires 7.

The grooves 3 are formed substantially in symmetrical relationship with respect to both the above-mentioned first plane and a second plane containing the axis of the duct 1, the second plane being normal to the first plane. This symmetrical relationship should be apparent from the drawings. With such symmetrical formation, noises due to eddy currents are uniform or symmetrical with respect to both planes, and are thereby substantially cancelled.

In the operation of the flow detection signal generator of the above described construction, an alternating magnetic field is established across the fluid flowing through the duct 1 by exciting the windings $4_1$ and $4_2$ from the A-C source 6. The fluid cuts the magnetic flux and a voltage is induced across the fluid. The induced voltage is measured by the liquid flowmeter connected to the electrodes 8a and 8b provided on the inner wall surface of the duct 1 to determine the quantity of the fluid flowing through the duct 1 per unit time, i.e., the rate of flow of the fluid.

The above described construction of the duct 1 formed with a plurality of axial parallel grooves 3 enables eddy currents to be reduced without an undue reduction of the mechanical strength of the duct. Also, variation of zero level is minimized. Thus, an electromagnetic flowmeter incorporating the duct of the present invention will have increased precision and reduced power loss as a result of the reduced eddy current loss. The number of grooves formed in the duct 1 is preferably such that the mechanical strength of the duct 1 will not be substantially lowered. One representative duct in accordance with this invention is compared with a conventional duct of the same type in the following table.

|  | Conventional duct | Duct according to the invention |
| --- | --- | --- |
| Duct diameter in millimeters | 100 | 100 |
| Applied voltage | 100 | 100 |
| Total power consumed in watts | 415.5 | 97.5 |
| Pipe loss in watts | 228.7 | 16.4 |
| Zero-level deviation expressed in fluid velocity in mm./second | 96 | 12 |
| Maximum fluid pressure in kg./cm.$^2$ | 100 | 100 |

As is seen from the above table, with the same duct diameter and the same pressure resistance, the pipe loss (i.e., the power consumed by the duct) of the duct according to the invention is much less than that of the conventional duct, thus reducing total power consumption. Also figures of the zero-level variation as listed above indicate that a considerable improvement in precision is achieved.

As has been apparent from the preceding description, the grooves 3 formed in the duct 1 are intended to reduce the eddy currents produced within the duct. The grooves may be modified in various ways as long as the mechanical strength of the duct 1 is not substantially reduced. However, it is important that the grooves 3 are formed substantially symmetrically with respect to both a first virtual plane containing the pair of electrodes 8a and 8b as well as to the axis of the duct 1 and a second virtual plane containing the axis of the duct 1, the second plane being normal to the first plane. The symmetrical relationship should be apparent from the drawings.

Figure 2:
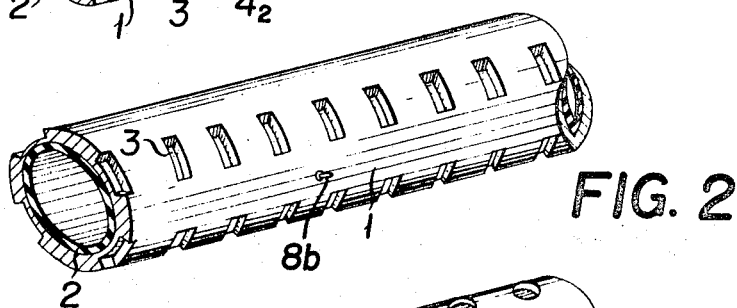
FIGS. 2 to 4 are perspective views, partly broken away, of various modifications of the duct used in the liquid flowmeter according to the invention.
Figure 3:
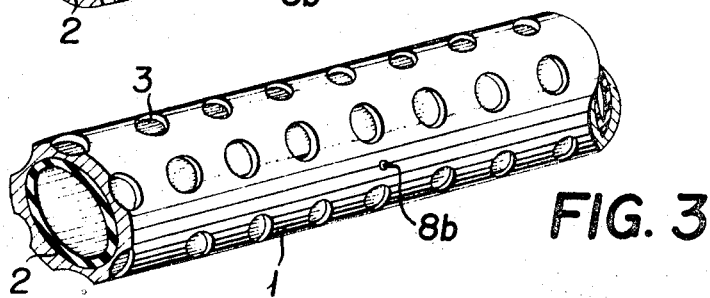
Figure 4:
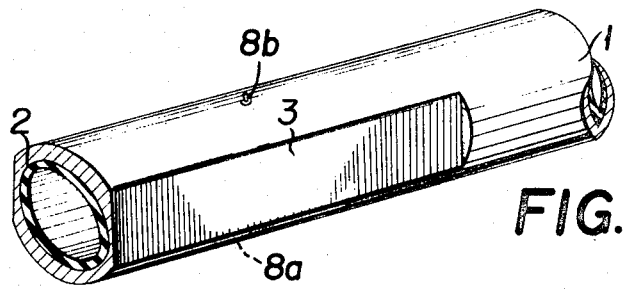

FIGS. 2 to 4, respectively, illustrate modifications of the duct according to the invention with like parts to those shown in FIG. 1 being indicated by like reference numerals. A duct 1 shown in FIG. 2 is formed with a plurality of substantially rectangular narrow outer slits 3 arranged in rows and suitably spaced from one another with their long sides perpendicular to the duct axis. FIG. 3 shows a duct 1 formed with circular recesses 3 suitably spaced from one another. In FIG. 4 there is shown a duct 1 having longitudinal flat notches cut therein. The exciting windings $4_1$ and $4_2$ may be disposed over any suitable parts of the outer surface of the ducts of FIGS. 1 to 3 since the grooves, notches or recesses are uniformly formed over the entire area of the outer surface of the duct 1. In case of the duct 1 shown in FIG. 4, however, the exciting windings are preferably disposed on diametrically opposed flat notches 3 to minimize eddy current effects.

Figures 5, 6, 7, 8:
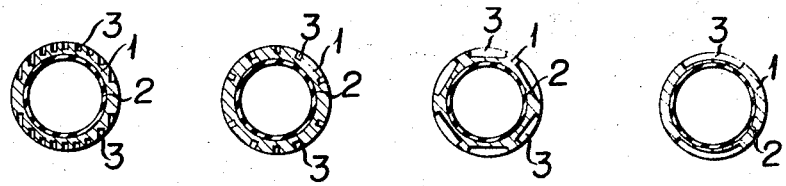
FIGS. 5 to 11 are cross sections of further modifications of the duct.
Figures 9, 10, 11:
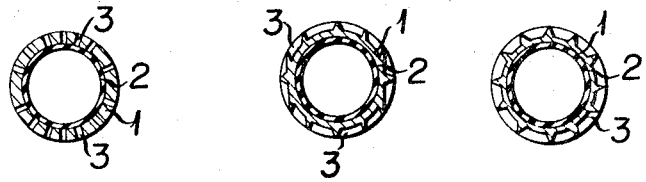

Further modifications of the duct where the grooves 3 are provided parallel to the axis of the duct 1 are illustrated in FIGS. 5 to 11. FIGS. 5–11 are sectional views along a plane not including the electrodes 8a and 8b. FIG. 5 shows a duct 1 provided with a plurality of parallel uniformly spaced axial outer grooves 3. FIG. 6 shows a duct 1 formed with relatively narrow axially extending radial grooves 3. FIG. 7 shows a duct 1 having relatively wide axial flat-bottomed grooves 3. FIG. 8 shows a duct 1 having a pair of diametrically opposed wide axial grooves having a uniform depth. FIG. 9 shows a duct 1 cut with axial grooves 3 which radially extend through the thickness of the duct wall and reach the inner lining 2. FIG. 10 shows a duct 1 provided with a plurality of axial outer grooves 3 such that parallel ribs are formed on the outer duct surface. FIG. 11 show a duct 1 provided with a plurality of outer axial grooves such that a corresponding number of radial ribs are formed on the duct.

Figure 12:
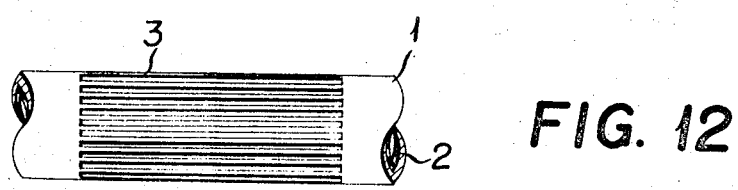
FIGS. 12 to 14 illustrate still further modifications of the duct.
Figure 13:
Figure 14:
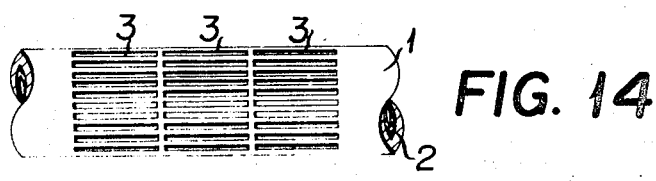

FIG. 12 shows a duct 1 having a plurality of uniformly spaced grooves 3 which may be longitudinally divided into two portions as shown in FIG. 13 or into three portions as shown in FIG. 14 do not illustrate the electrodes 8a and 8b. The positioning of the electrodes should be apparent in view of the embodiments of FIGS. 1–4.

It is to be understood from the foregoing description that the grooves or notches formed in the duct according to this invention may be of any configuration so long as the specified symmetrical relationship is satisfied and the mechanical strength of the duct is held above a predetermined value by proper selection of the width and/or depth of the grooves or notches.

The duct lining as described above is necessary only when the electrical conductivity of the duct is greater than that of the fluid. When the conductivity of the duct is less than that of the fluid, the duct lining may be dispensed with.

What is claimed is:

1. In a signal generator for electromagnetic flowmeters having a nonmagnetic metal duct through which the flow rate of a conducting fluid is to be measured, a pair of diametrically opposed electrodes insulatingly mounted to the wall of said duct and located to contact said fluid flowing through said duct, and means to generate an alternating magnetic field substantially perpendicular to both a line connecting said diametrically opposed electrodes and the direction of fluid flow, the improvement comprising:

a plurality of cuts formed in the outer periphery of said duct to reduce eddy currents produced in said duct by said alternating magnetic field while maintaining the mechanical strength of the duct at a predetermined value.

2. A signal generator according to claim 1 wherein said cuts are formed axially with respect to said duct.

3. A signal generator according to claim 1 wherein said cuts are formed substantially perpendicular to the longitudinal axis of said duct.

4. A signal generator according to claim 1 wherein said cuts are circular recesses.

5. A signal generator according to claim 1 further comprising an insulating lining along the length of the inner surface of the duct and wherein at least a portion of said cuts extend through the radial wall thickness of the duct.

6. A signal generator according to claim 1 wherein said cuts are longitudinal grooves formed parallel to the longitudinal axis of said duct.

7. A signal generator according to claim 6 comprising at least two grooves symmetrically located with respect to both a first plane containing the pair of opposed electrodes and the longitudinal axis of said duct, and a second plane normal to said first plane and also containing the longitudinal axis of said duct.

References Cited

UNITED STATES PATENTS 3,108,474  10/1963  Sasaki et al. _____ 73—194

CHARLES A. RUEHL, Primary Examiner